US009185883B2

(12) United States Patent
Hoffmann

(10) Patent No.: US 9,185,883 B2
(45) Date of Patent: Nov. 17, 2015

(54) ANIMAL COVER WITH SPIKE MAT

(76) Inventor: Max Hoffmann, Kungsägen (SE)

( * ) Notice: Subject to any disclaimer, the term of this patent is extended or adjusted under 35 U.S.C. 154(b) by 163 days.

(21) Appl. No.: 14/008,470

(22) PCT Filed: Feb. 28, 2012

(86) PCT No.: PCT/SE2012/050224
§ 371 (c)(1),
(2), (4) Date: Dec. 6, 2013

(87) PCT Pub. No.: WO2012/134371
PCT Pub. Date: Oct. 4, 2012

(65) Prior Publication Data
US 2014/0083373 A1 Mar. 27, 2014

(30) Foreign Application Priority Data
Mar. 28, 2011 (SE) ........................................ 1150272

(51) Int. Cl.
*B68C 1/12* (2006.01)
*B68C 5/00* (2006.01)
*A01K 13/00* (2006.01)
*A61H 39/04* (2006.01)

(52) U.S. Cl.
CPC ............... *A01K 13/006* (2013.01); *A61H 39/04* (2013.01)

(58) Field of Classification Search
CPC ........ A01K 13/00; A01K 13/008; B68C 1/12; B68C 5/00
USPC .................. 119/850; 54/79.1, 79.2, 79.3, 79.4
See application file for complete search history.

(56) References Cited

U.S. PATENT DOCUMENTS

| 530,085 | A |   | 12/1894 | Bustin |
|---|---|---|---|---|
| 530,864 | A |   | 12/1894 | Torrey |
| 5,127,213 | A |   | 7/1992 | Petronio |
| 5,127,897 | A | * | 7/1992 | Roller ..................... A61F 5/024 128/107.1 |
| 5,267,947 | A | * | 12/1993 | James ..................... A61F 5/028 2/311 |
| 5,381,558 | A | * | 1/1995 | Lo ............................ A41B 1/00 2/115 |
| 5,426,925 | A |   | 6/1995 | Smargiassi |
| 5,571,076 | A | * | 11/1996 | Cooper ................... A61F 5/028 2/44 |
| 5,806,093 | A | * | 9/1998 | Summers ................ A41D 1/00 2/115 |
| 5,978,965 | A | * | 11/1999 | Summers ................ A41B 1/00 2/115 |

(Continued)

FOREIGN PATENT DOCUMENTS

| DE | 10154709 A1 | 5/2003 |
|---|---|---|
| DE | 10200003 A1 | 1/2004 |
| DE | 102006014528 A1 | 10/2007 |

OTHER PUBLICATIONS

International Search Report received for PCT Patent Application No. PCT/SE2012/050224, mailed on Apr. 17, 2012, 5 pages.

(Continued)

*Primary Examiner* — Monica Williams
(74) *Attorney, Agent, or Firm* — Morrison & Foerster LLP

(57) ABSTRACT

This invention concerns an animal cover 1 comprising a piece of fabric 2 with an extended surface area and at least one spike mat 3-5. Each spike mat 3-5 is arranged and fixed in place on the side 2a of the piece of fabric 2 that is in contact with the animal, with the spikes 3a-5a of the spike mat facing in towards the animal.

13 Claims, 2 Drawing Sheets

(56) References Cited

U.S. PATENT DOCUMENTS

| | | | | |
|---|---|---|---|---|
| 5,997,380 | A | * | 12/1999 | Yang .............. A41C 3/144 450/30 |
| 6,086,609 | A | * | 7/2000 | Buckley ............ A61F 7/10 607/104 |
| 6,099,490 | A | * | 8/2000 | Turtzo ............ A61F 5/028 2/311 |
| 6,267,083 | B1 | * | 7/2001 | Chimienti ......... A01K 13/006 119/850 |
| 6,502,532 | B2 | | 1/2003 | Sjölin |
| 6,700,031 | B1 | * | 3/2004 | Hahn ............ A61H 7/001 601/134 |
| 7,207,953 | B1 | * | 4/2007 | Goicaj ............ A61H 23/02 601/134 |
| 7,247,145 | B2 | * | 7/2007 | Kancilja ......... A44B 11/006 128/845 |
| 7,653,948 | B2 | * | 2/2010 | Schwenner ........ A61H 7/001 2/69 |
| D656,691 | S | * | 3/2012 | Jansson ............... D30/145 |
| 8,176,880 | B2 | | 5/2012 | Hurwitz |
| 8,539,615 | B1 | * | 9/2013 | Carver ........... A41D 13/0156 2/244 |
| 2002/0121247 | A1 | | 9/2002 | Sharpe |
| 2006/0042199 | A1 | | 3/2006 | Donahue |
| 2006/0213156 | A1 | | 9/2006 | Nilfuroshan |
| 2010/0146914 | A1 | | 6/2010 | MacDonald |
| 2010/0277945 | A1 | | 11/2010 | Hurwitz |
| 2011/0041779 | A1 | | 2/2011 | Hurwitz |
| 2011/0041780 | A1 | | 2/2011 | Hurwitz |

OTHER PUBLICATIONS

Final Office Action received for U.S. Appl. No. 13/352,028, mailed on May 29, 2013, 15 pages.

Non Final Office Action received for U.S. Appl. No. 13/352,028, mailed on Dec. 28, 2012, 10 pages.

Kristoffersson, Mia, "Akupunktur För Amatörer", Lucky Rider, 2010, p. 76. See Statement Under 37 CFR § 1.98(a) (3).

* cited by examiner

ANIMAL COVER WITH SPIKE MAT

CROSS REFERENCE TO RELATED APPLICATIONS

This application is a U.S. National Phase patent application of PCT/SE2012/050224, filed on Feb. 28, 2012, which claims priority to Swedish Patent Application No. 1150272-1, filed on Mar. 28, 2011, each of which is hereby incorporated by reference in the present disclosure in its entirety.

TECHNICAL AREA

This invention concerns an animal cover intended to be used on and around the body of an animal as specified by the patent claims.

BACKGROUND

The use of various types of animal cover to keep an animal warm and dry is previously known. Such covers are normally manufactured from fabric or a material similar to fabric with an extended surface area and with various properties. They are either placed onto the animal or wrapped around the animal, or both, in order to offer warm protection that also protects from water during transport, while the animal is outdoors, and on other occasions.

DESCRIPTION OF THE INVENTION

One purpose of this invention is to offer an animal cover that not only provides warmth and protection from the weather, but also stimulates the muscles of the animal.

This is achieved with an animal cover as specified in claim 1.

DETAILED DESCRIPTION OF EMBODIMENTS

Figure 1:
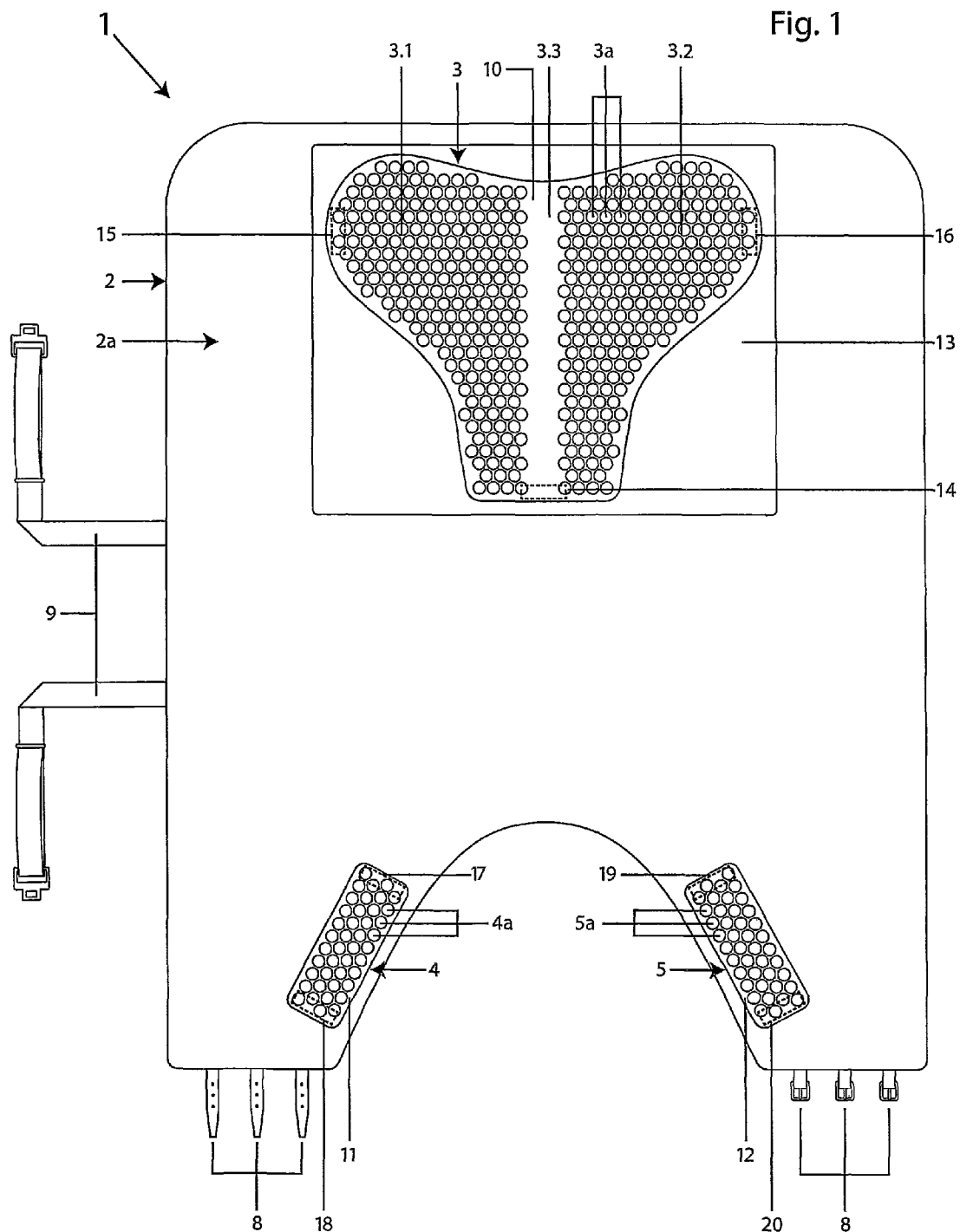
FIG. 1 shows an animal cover, its inner surface, that surface of the animal cover that lies against the animal when the animal cover is in use, according to the invention.
Figure 2:
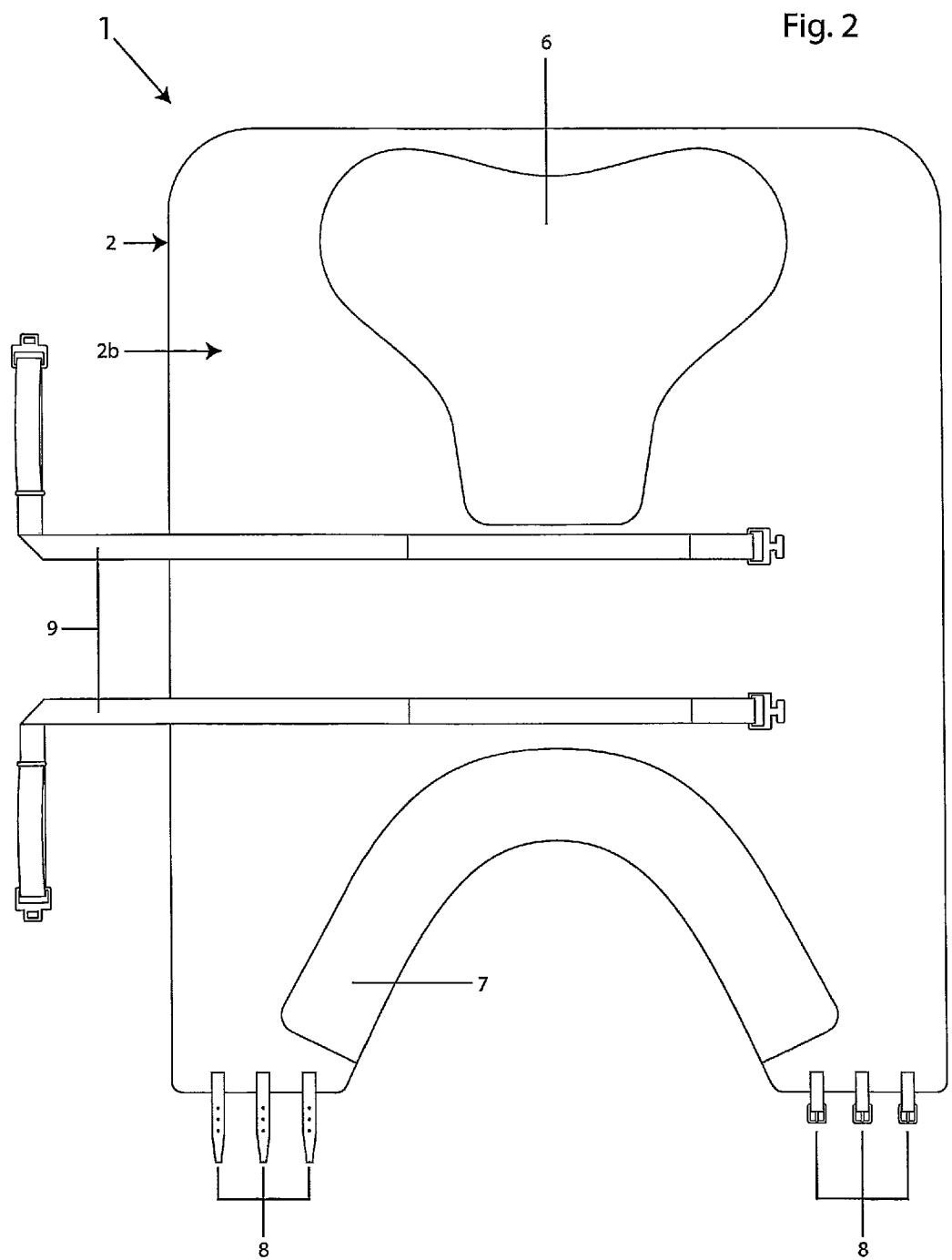
FIG. 2 shows the second surface of the animal cover, its outer surface, that surface of the animal cover that faces away from the animal and out towards the surroundings.

The invention concerns an animal cover 1 that comprises a piece of fabric 2 with an extended surface area and at least one spike mat 3-5, a construction that has an extended area with protruding spikes, 3a-5a. Each spike mat 3-5 is arranged and fixed in place on the side 2a of the piece of fabric 2 that is in contact with the animal when the animal cover 1 is in use, with the spikes 3a-5a facing in towards the animal. See FIGS. 1 and 2. The animal cover 1 in the drawings is provided with three different spike mats 3-5.

Each spike mat 3-5, the spikes 3a-5a of each mat, come into contact with the animal and each spike 3a-5a constitutes an acupressure point at which a specific point, a trigger point, of the animal is contacted and stimulated. The contact of many spikes, a complete spike mat, onto the animal, and the stimulation of the animal at many trigger points that thus arises, results in an increase in the blood circulation of the animal. An increase in blood circulation is good for the animal during, among other occasions, the period before exercise and competition, during recovery after exercise and competition, and it is generally good for the wellbeing of the animal. An increase in blood circulation leads also to an increase in the relaxation of the animal, and a fall in its level of stress.

A spike mat 3 is located in such a manner that the spike mat 3 lies in contact with the muscles of the back and the lower back of the animal when the animal cover 1 lies on the animal. The spike mat 3 is located centrally in the piece of fabric 2 at its rear edge 2.1, at the area that lies on the rear part of the animal when the animal cover 1 is in use. The spike mat 3 is divided into two regions 3.1 and 3.2 such that the active spikes 3a of the spike mat are located in these two regions 3.1 and 3.2. The regions 3.1 and 3.2 are arranged one on each side of the spine of the animal, with a region 3.3 that is free of spikes between them, such that the spine of the animal lies free under this region 3.3. Thus, there are no spikes that are in contact with the animal on or in the direct vicinity of its spine.

Two further spike mats 4 and 5 are located in such a manner that the spike mats 4 and 5 come into contact with the shoulder muscles of the animal when the animal cover 1 is placed onto an animal. Since the piece of fabric 1 is divided at this part of the animal cover 1, two spike mats 4 and 5 are used, one on each side of the shoulder section of the animal. If the animal cover 1 is undivided in this region, it is possible to use only one spike mat, which is in contact with the shoulder muscles of the animal.

An animal cover 1 according to the invention may be provided with either fewer or more numerous spike mats, depending on the animal it is to be used with and the requirement for stimulation.

The animal cover 1 comprises fabric additions 6 and 7 arranged at those regions where the spike mat or spike mats 3-5 is or are located, in order to place a load on the animal cover 1 and to press the spike mat or spike mats 3-5 against the animal. The fabric additions 6 and 7 are located and attached to the animal cover 1 on that side 2b of the animal cover 1 that faces away from the animal. The fabric additions 6 and 7 comprise a coarser fabric or similar material, or another type of material with an extended surface area that has weight.

The animal cover 1 comprises attachment arrangements 8 and 9 that place various parts of the animal cover 1 under tension such that the animal cover 1 will surround the body of the animal and be kept in place against the body of the animal. The attachment arrangements 8 and 9 make possible a contact that can be adjusted of the animal cover 1 against the body of the animal and a pressure that can be adjusted of the spike mats 3-5 against the body of the animal. Different animals demonstrate different sensitivities for external stimulation and any one animal can demonstrate different sensitivities on different occasions, and it is therefore an advantage to be able to adjust the force with which the trigger points of the animal can be stimulated.

A first set of attachment arrangements 8 is located such that the arrangements make it possible to place the animal cover 1 under tension at the shoulders of the animal. A second set of attachment arrangements 9 is located such that the arrangements make it possible to place the animal cover 1 under tension at the body of the animal, around its stomach The material of the spike mats is, among other materials, textile and plastic, for example at least one of neoprene, TPE and EVA.

Each spike mat 3-5 comprises spikes 3a-5a of a plastic material. Plastic materials are easy to form, give a lightweight construction and are normally relatively easy to clean, something that is not unimportant when considering the care of animals.

Each spike mat 3-5 comprises a soft flexible layer 10-12, a padded layer of fabric or a material similar to fabric, over which a number of spikes have been placed and to which the spikes are attached. This design ensures that the spike mat 3-5 is rather flexible, and this in turn ensures that the spike mat can be formed according to the shape of the body of the animal and come into close contact with the body of the animal, which in turn ensures good and even distribution of the pressure of the spikes against the body of the animal.

The animal cover 1 comprises an insulating or a warming, or an insulating and warming, layer 13 arranged between the piece of fabric 2 and the spike mat 5. The insulating or warming layer, or the insulating and warming layer, 13 comprises artificial fur fabric or a similar insulating material, or a unit, such as electrical circuits, that spreads heat or transfers heat. Such a layer 13 has been drawn in the drawings solely at the spike mat 3 that is placed over the lower back of the animal, but similar insulating or warming layers, or insulating and warming layers, may be located at spike mats placed at other positions.

The spike mats 3-5 of the animal cover are attached at the piece of fabric 2 or at the insulating layer, where this is available. It is appropriate that the spike mats 3-5 be attached in such a manner that they can be removed from the piece of fabric 2 or the insulating layer 13 for, for example, cleaning, in order subsequently to be attached to the piece of fabric 2 or the insulating layer 13. The attachment that allows it to be removed makes it possible also to exchange simply not only the piece of fabric 2 but also the spike mat or spike mats 3-5, depending on such factors as the weather, wind, animal, its size and its need of treatment.

Each spike mat 3-5 is attached, in a manner that allows it to be removed, to the piece of fabric 2 or the insulating layer 13 with the aid of fixing arrangements 14-20. The fixing arrangements 14-20 comprise a first part arranged at or constituting part of the piece of fabric 2 or insulating layer 13 and a second part arranged at or constituting part of the spike mat 3-5. The first part and the second part are caused to interact with each other in a manner that locks them together and that allows them to be subsequently separated. The first part and the second part each comprise one part of a hook-and-loop arrangement, a zip arrangement, a button arrangement, a snap-button arrangement or a similar construction. Such a fixing arrangement 14-20 is not shown in detail in the drawings since its design is not important for the invention, solely its function.

The animal cover 1 has been developed and tested for use on horses, and the locations of the spike mats 3-5 that are shown in the drawings are adapted to the musculature of a horse. An animal cover 1 according to this invention, however, can be used also on other animals. It may in this case be necessary to modify the animal cover 1 in order to fit the other animal and its musculature.

This description of the invention is not to be regarded as a limitation of the invention: it is to be interpreted based on the innovative concept that is given in the attached patent claims, and the invention is to be given a reasonable protective scope. Technical distinctive features and details that are described above may be freely combined as long as the desired design and function are obtained.

The invention claimed is:

1. An animal cover comprising:
   a piece of fabric with an extended surface area;
   at least one removable spike mat arranged and attached to one side of the piece of fabric that lies in contact with an animal, the spike mat covering only a portion of the piece of fabric, the spike mat comprising spikes facing in towards the animal, the spike mat attached to the piece of fabric with attachment members comprising a first part arranged at or constituting a part of the piece of fabric and a second part arranged at or constituting a part of the spike mat and where the first part and the second part are caused to interact with each other in a manner that locks them together and allows them to be subsequently released;
   a fabric addition located and attached to the piece of fabric on a side facing away from the animal and placed over only the region the spike mat is located so as to place a load on the animal cover and press the spike mat against the animal; and
   the piece of fabric comprising attachment arrangements that place various parts of the animal cover under tension such that the animal cover will surround the body of the animal and which attachment arrangements make it possible to place the animal cover against the body of the animal in a manner that can be adjusted, and with adjustable pressure of the spike mat against the body of the animal.

2. The animal cover according to claim 1, where the spike mat is located in such a manner that the spike mat lies in contact with the muscles of the back and the lower back of the animal when the animal cover lies on the animal.

3. The animal cover according to claim 2, where the spikes of the spike mat are located in two regions arranged on each side of the spine of the animal, with a region that is free of spikes between them.

4. The animal cover according to claim 1, where the spike mat is located in such a manner that the spike mat is in contact with the shoulder muscles of the animal when the animal cover lies on the animal.

5. The animal cover according to claim 4, where the spike mat lies in contact with the shoulder muscles of the animal on one side.

6. The animal cover according to claim 1, where the fabric addition comprises a coarser fabric with an extended surface area that has weight.

7. The animal cover according to claim 1, where the spike mat comprises spikes of a plastic material.

8. The animal cover according to claim 1, where the spike mat comprises a soft, flexible layer over which a number of spikes are located and to which the spikes are attached.

9. The animal cover according to claim 1, comprising an insulating or a warming, or an insulating and warming, layer arranged between the piece of fabric and the spike mat.

10. The animal cover according to claim 9, where the insulating or warming layer, or the insulating and warming layer, comprises artificial fur fabric or a similar insulating material that spreads heat.

11. The animal cover according to claim 1, where the first part and the second part of the attachment members each comprises one part of a hook-and-loop arrangement, a button arrangement, a snap-button arrangement or a similar construction.

12. The animal cover according to claim 1, wherein the animal is a horse.

13. An animal cover comprising:
    a piece of fabric with an extended surface area;
    at least two removable spike mats arranged and attached to one side of the piece of fabric that lies in contact with an animal, the spike mats comprising spikes facing in towards the animal,
    wherein one spike mat is placed on a front portion of the fabric, another spike mat is placed on a back portion of the fabric, and no spike mat is placed between the front portion and the back portion, the front portion being configured to cover a shoulder of the animal, and the back portion being configured to cover a lower back of the animal, the spike mats attached to the piece of fabric with attachment members comprising a first part arranged at or constituting a part of the piece of fabric and a second part arranged at or constituting a part of the spike mats and where the first part and the second part are caused to interact with each other in a manner that locks them together and allows them to be subsequently released;

a fabric addition located and attached to the piece of fabric on a side facing away from the animal and placed over only the regions the spike mats are located so as to place a load on the animal cover and press the spike mats against the animal; and the piece of fabric comprising attachment arrangements that place various parts of the animal cover under tension such that the animal cover will surround the body of the animal and which attachment arrangements make it possible to place the animal cover against the body of the animal in a manner that can be adjusted, and with adjustable pressure of the spike mats against the body of the animal.

* * * * *